March 12, 1963  J. W. JOHANSSON  3,080,757
VARIABLE RESISTANCE PRESSURE RESPONSIVE TRANSDUCER
Filed Nov. 12, 1959  2 Sheets-Sheet 1

INVENTOR.
JAMES W. JOHANSSON
BY
*George C. Sullivan*
Agent

INVENTOR.
JAMES W. JOHANSSON

United States Patent Office

3,080,757
VARIABLE RESISTANCE PRESSURE RESPONSIVE TRANSDUCER

James W. Johansson, Panorama City, Calif., assignor to Lockheed Aircraft Corporation, Burbank, Calif.
Filed Nov. 12, 1959, Ser. No. 852,431
3 Claims. (Cl. 73—398)

This invention relates to a fluid pressure measuring system and more particularly, to equipment for measuring pulsating and steady pressures by electrical means. More particularly, it relates to a fluid pressure transducer which uses a pressure responsive diaphragm.

A prior pressure measuring means utilized a pressure responsive diaphragm connected to a sensitive carbon pile resistance so that increased pressures decreased the resistance of said carbon pile and then the resistance was measured by some means. It was found, however, that where there was any appreciable diaphragm movement, the carbon granules of the pile tended to separate from each other, giving poor contact resulting in a non-linear resistance characteristic. Another problem of this type of pressure measuring means was that the carbon granules would pack together and refuse to follow the diaphragm pulsations where the pressure was not constant. Upon repeated loading and unloading of the carbon granules, there was abrasive action between them with resultant pulverization and erroneous readings.

Another prior means to measure pressure involved the use of a pressure responsive diaphragm as part of a variable condenser to pick up pressure pulsations. Such a variable capacity pickup, however, had the disadvantage that if it is used in a D.C. bridge, it will pick up only dynamic pressure but would not pick up any static pressure differences since it responds only to a change in capacity. Moreover, if these capacity pickups were used in either a D.C. bridge or an A.C. bridge with an associated carrier system, it was necessary to have one stage of amplification adjacent to the pickup because of errors induced by the distributed capacitance of the leads to the condenser element which resulted in a very large and bulky pickup which is impractical in aerodynamic and hydraulic applications.

Another prior method involved optical systems with mirrors cemented to the pressure responsive diaphragm. The response to the device was so small for the pressure differentials being measured that an elaborate optical system was required. The result was that in most applications, the vibration of the component parts in the optical system caused a greater error than the pressure of the optical system to the movement of the pressure responsive diaphragm.

Another prior method has involved coating a pressure responsive diaphragm with a material having an appreciable electrical resistance per unit length and placing the diaphragm in such a position that deflections due to pressure will cause varying degrees of area to contact a conducting means so that when connected with an electrical circuit, the total resistance would be varied according to the pressure applied. In order to attain an appreciable resistance, a heavy coating of resistance material on the surface of the diaphragm was required which reduced its response to dynamic pressures and resulted in friction within the material itself and high wear and short life.

It is an object of this invention to provide a pressure responsive device capable of responding to rapid fluctuations of pressure.

It is another object of this device to provide pressure responsive means sensitive to minor variations in pressure.

It is still another object of the present invention to provide means by which a wide range of pressures may be detected. It is another further object of this invention to provide a device of the general character described which will permit comparison of two different pressures. There are two pressure inlets provided which may influence the pressure responsive diaphragm from opposite sides so that the result is a comparison between the two separate pressures.

It is a further object of this device to provide pressure measuring means which may measure fluid pressures of fluids having corrosive qualities without damage to the diaphragm. Other objects and advantages will become evident as the invention is described in greater detail, reference being had to the drawings wherein.

The pressure responsive transducer according to the present invention is usable on any system where there is a fluid under pressure, which pressure it is desired to be measured. In any hydraulic system, there is usually required some means to measure the pressure within the system. Direct reading means using an aneroid to which a dial is directly connected is common. However, when the pressures must be read at a remote point, it is impracticable to conduct the fluid of the hydraulic system to the aneroid-dial unit. The present invention makes possible the sensing of the pressures, then transducing those pressures to an electrical current which then may be conducted with ease to a distant point for remote indication. The electrical energy may be transduced further to radiant energy and transmitted by radio means. Such a system would be used when it is necessary to measure aerodynamic pressures on pilotless aircraft or missiles which would be read at a ground station. The present device is useful in measuring any air pressures, including measuring of sound waves which, when transduced to electrical energy, could be retransduced into sound energy at a distant point. The usefulness of the present device is unlimited.

The theory of operation of the present device is that pressure differences of opposite sides of a flexible diaphragm fixed around its peripheral edge will cause deflection of that diaphragm.

Attached to the flexible part of the diaphragm are electrical means which will change resistance relative to movement of the diaphragm. The resistance may be continually measured with the indicating means calibrated in pressure units. A potentiometer type resistor is provided wherein parallel elements of constant resistance per unit length are fixed to the surface of the flexible diaphragm from the center outwardly. A wiper plate is provided in such a relation that flexure of the diaphragm due to pressure differences on its opposite sides will cause it to short the parallel elements at varying points, thus varying the effective length between the ends of the resistance elements. The total resistance between the ends of the elements is thus varied. This resistance is continually measured by known means.

Figure 1:
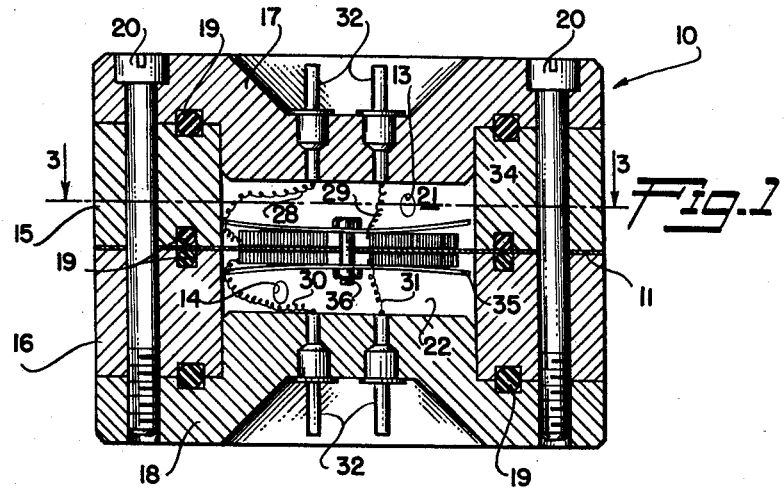
FIG. 1 is a cross-sectional view of the transducer on a plane perpendicular to the pressure responsive diaphragm.

Referring to FIG. 1, the transducer 10 is comprised of a pressure responsive diaphragm 11 enclosed in a housing which has an opening 13 through which pressures to be measured may flow. The housing is comprised of two cylinders 15 and 16 of equal diameter on a common axis with the diaphragm 11 mounted in fluid-tight relationship between them. The cylinders 15 and 16 are closed at their outer ends by end plates 17 and 18 to define chambers 21 and 22. The housing is held together by bolts 20. The diaphragm 11, the cylinders, and the end plates are held in fluid-tight relationship by O-rings 19.

Figure 2:
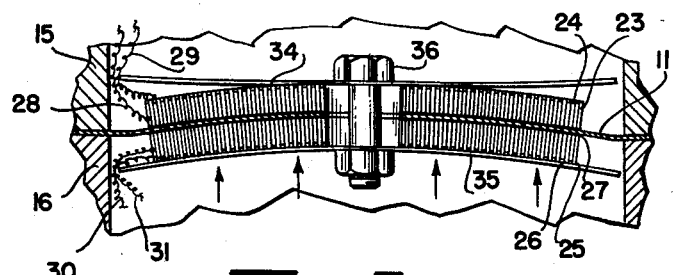
FIG. 2 is an enlarged view of the diaphragm showing the resistance elements in detail.

Fixed to the surface of the diaphragm 11, as shown more specifically in FIG. 2, are two electrical conducting means having a relatively high resistance of rectangular configuration. Each of the resistance members 23 and 24, 25 and 26 are of rectangular cross section and wound spirally from the center of the diaphragm 11 to adjacent the area where the diaphragm joins the cylinders 15 and 16. Each resistance member 23—26 is wound on one of its narrow edges with electrical insulating means 27 between. The use of a rectangular resistance element allows for closer winding, thus a more finite resolution of resistances. The resistance elements 23 and 24 are connected at their inner end, as are resistance elements 25 and 26 on the lower side of the diaphragm 11. From resistance element 23, lead 28 extends to its pole 32 on the exterior of the housing. Likewise, lead 29 extends from the resistance element 24 to its pole 32; leads 30 and 31 from the resistance elements 25 and 26 to their poles 32 on the exterior of the housing.

In order to vary the resistance in the circuit from the lead 28 to 29, a convex wiper plate 34 is provided to short the resistances 23 and 24 at varying points from the center of the diaphragm outwardly, depending on the deflection of the diaphragm 11 as caused by the varying pressure to be measured. The convex wiper plate 34 on top of the diaphragm 11 and its identical wiper plate 35 on the lower side of the diaphragm 11 are fixed to the center of the diaphragm 11 concentrically by bolt 36 which is insulated from the wiper plates 34 and 35 and the diaphragm 11. The wiper plate 35 will short out the elements 25 and 26 in the same manner as the convex wiper plate 34. FIG. 2 shows the pressure on the lower side of the diaphragm 11 greater than that on the upper side, thus the lower side has less resistance than the upper side of the diaphragm.

Figure 3:
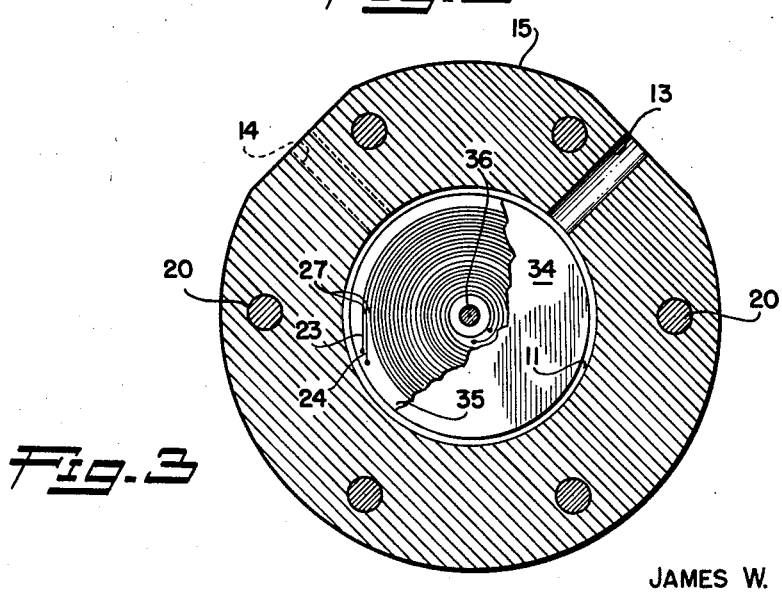
FIG. 3 is a sectional view taken on lines 3—3 of FIG. 1.

In the configuration shown in FIGS. 1 to 3, the opening 13 to chambers 21 is connected to the pressure, either dynamic or static, which is to be measured. Opening 14 to chamber 22 is connected to a reference pressure with which the pressure to the opening 13 is to be compared. It can be seen that by varying the reference pressure to the opening 14, the range measurable through opening 13 may be varied. That is, if high pressures are to be measured, a higher reference pressure to chamber 22 will be provided. If very low pressures are to be measured, then a lower reference pressure to chamber 22 is provided. When the pressure is greater in the upper chamber 21 than it is in the chamber 22, the diaphragm will be pushed downwardly. Thus, the convex wiper plate 34 will short the resistance elements 23 and 24 at a point close to the circumference of the wiper plate and the diaphragm 11. On the lower side of the diaphragm 11, the wiper plate 35 will short the resistance elements 25 and 26 at a point close to the center of the diaphragm, resulting in a higher resistance. These resistances may be measured by any means, for example, the bridge circuit as shown in FIG. 4.

Figure 4:
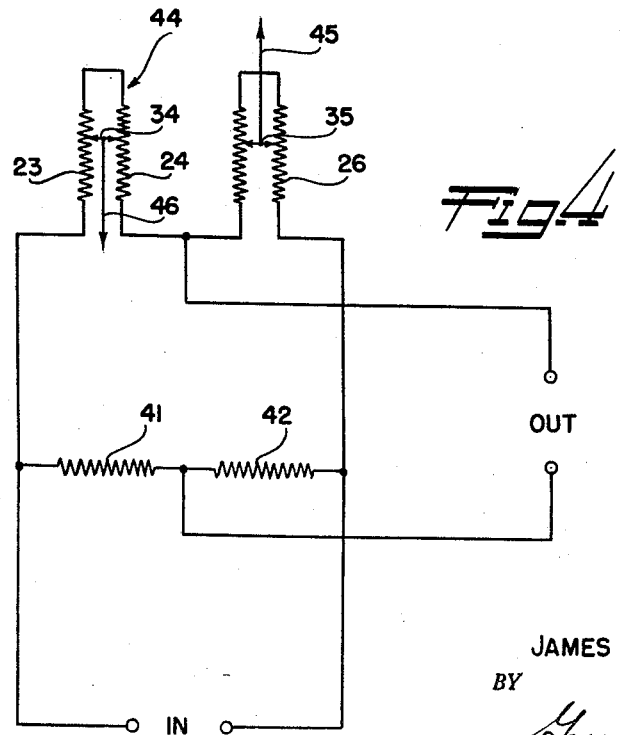
FIG. 4 is a sketch of the bridge circuit by which the varying pressures may be measured in electrical devices.

In FIG. 4, the wiper plates are represented by arrows 34 and 35. The resistance on each side of the diaphragm 11, that on the top being from elements 23 and 24 and that on the bottom from elements 25 and 26, are compared with resistance elements of a fixed value 41 and 42 in a bridge circuit, the operation of which is well known. The arrows 45 and 46 represent the movement of the wiper plates 34 and 35 when the pressure on the upper side of the diaphragm decreases from the reference pressure below the diaphragm 11 as shown in FIG. 2.

Figure 5:
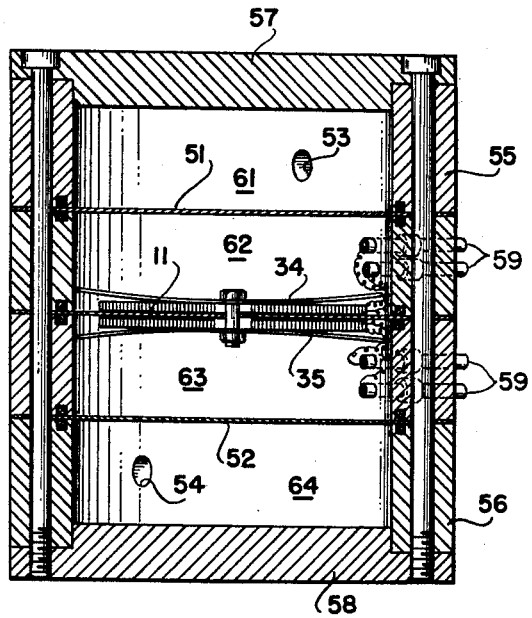
FIG. 5 is a modification of the transducer shown in FIG. 1 with corrosive protection diaphragms on either side of the pressure sensitive diaphragm.

When the fluids, the pressures of which are to be measured, are corrosive in character or might have some electrical conductivity so as to start the parallel conductive elements 23 and 24 or 25 and 26 producing erroneous readings, protective diaphragms 51 and 52 may be provided as shown in FIG. 5. This requires the use of two additional cylindrical members 55 and 56 and end plates 57 and 58. The diaphragms 51 and 2 are in fluid-tight relationship as is the diaphragm 11 so that pressure within the chamber defined by 61 will cause an elevation in the chamber 62 deflecting the diaphragm 11 downwardly, resulting in a change in resistance of the elements 23, 24. The diaphragm 11, the resistance elements 23 through 26 and the convex wiper plates 34, 35 of FIG. 5 are identical to those of FIG. 1. The leads 28 through 31 are attached to poles 59 in the sides of the cylinders instead of the end plates in FIG. 5. Likewise, the pressure in chamber 64 as a result of the reference pressure from through the opening 54 causes a change in pressure in 63 by deflection of the diaphragm 52 which influences again the deflection of diaphragm 11. Where the reference pressure is non-corrosive, the diaphragm 52 may be eliminated.

Any pressures may be measured by the device disclosed in this present specification, including those produced by sound. Thus, the present device will function as a microphone. By making the diaphragm resilient, its responsive to dynamic pressure will be improved.

By connecting one of the poles 32 to convex wiper plate 34, the parallel resistance element 24 may be eliminated. The same will, of course, hold true for element 26 and plate 35. The use of resistance means on both sides of diaphragm 11 increases the resolution. Where resolution is not important, the lower resistance means may be eliminated. When a bridge circuit is used to measure the resistance in this instance there would be three fixed resistors with the variable resistance element on the diaphragm.

It is to be understood that the device shown and described herein to illustrate the invention may be modified by substituting equivalent elements for those shown, by altering those elements and even eliminating some elements where the claims which follow do not require them.

Having revealed the details of my invention, I c'aim the following combinations and their equivalents as my property for which I desire protection under a United States Letters Patent.

What is claimed is:

1. A variable resistance pressure responsive transducer comprised of two cylindrical members of equal diameter on a common axis with a flexible diaphragm having substantially equal diameter to said cylindrical members mounted therebetween in a fluid-tight relationship with said cylindrical members to form a partition between the areas within each of said cylindrical members, a first electrical resistance element fixed to each side of said diaphragm from its center to its edge, a second electrical resistance element on each side from the center of said diaphragm to its edge in parallel relationship to and insulated from said first resistance element, electrical conducting means from each of said resistance elements to the exterior of said cylindrical members, electrical'y conducting convex wiper discs, means to mount said discs in face-to-face relationship rigidly to the center of and on either side of said diaphragm in contact with said resistance elements so as to form an electrical conducting means from said first resistance elements to said second said resistance elements, fluid-tight closure means on the ends of said cylindrical members opposite to said flexible diaphragm so as to form two separate chambers and means to apply a pressure difference between said chambers so that said diaphragm will be flexed to vary the point of contact of said convex members on said resistance elements.

2. A device to translate fluid pressure into a measurable electrical signal comprised of a flexible flat diaphragm adapted to be fixed about its peripheral edge, an elongated electrical resistance member of rectangular cross section fixed to the surface of said flexible diaphragm on one of its narrow edges spiralling from the center of said flexible diaphragm to its edge, a second elongated electrical resistance member of identical cross section to said first electrical resistance member spiralled from the center to the edge of said flexible diaphragm in parallel insulated relationship from the first said resistance member, a disc-shaped convex electrical conductive wiper plate fixed at its center to the center of said flexible diaphragm and facing said diaphragm, said convex wiper plate contacting said first and second resistance members on their narrow edges opposite to the narrow edges fixed on the surface of said flexible diaphragm at a single point so as to form an electrical conducting means from said first resistance member to said second resistance member, means to apply an electrical potential between said resistance member at the edge of said flexible diaphragm, means to apply a pressure difference between the opposite sides of said diaphragm so that said diaphragm will flex to cause said disc-shaped wiper member to vary its point of contact with said resistance member so as to vary the resistance between the ends of said first resistance member and said second resistance member at the edge of said diaphragm and means to measure said resistance.

3. A device as in claim 2 wherein there is a first resistance member and a second resistance member and a convex wiper plate on each side of said flexible diaphragm.

References Cited in the file of this patent

UNITED STATES PATENTS

| | | |
|---|---|---|
| 2,439,092 | Linstrom | Apr. 6, 1948 |
| 2,580,407 | Clark | Jan. 1, 1952 |
| 2,699,069 | Bailey | Jan. 11, 1955 |